Figure 1:
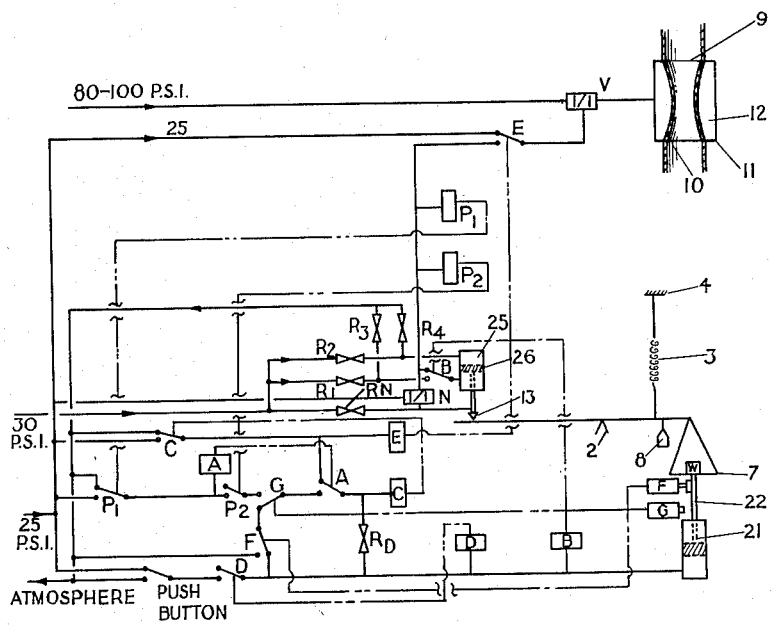

March 10, 1964 A. K. LLOYD 3,124,207
AUTOMATIC CONTROL OF WEIGHING AND FEEDING MACHINES
Filed Feb. 6, 1961 2 Sheets-Sheet 1

INVENTOR
ARTHUR KENNETH LLOYD
BY Cushman, Darby & Cushman
ATTORNEYS

March 10, 1964  A. K. LLOYD  3,124,207
AUTOMATIC CONTROL OF WEIGHING AND FEEDING MACHINES
Filed Feb. 6, 1961  2 Sheets-Sheet 2

INVENTOR
ARTHUR KENNETH LLOYD

BY Cushman, Darby & Cushman
ATTORNEYS

United States Patent Office 3,124,207
Patented Mar. 10, 1964

3,124,207
AUTOMATIC CONTROL OF WEIGHING AND FEEDING MACHINES
Arthur Kenneth Lloyd, Welwyn, England, assignor to Imperial Chemical Industries Limited, London, England, a corporation of Great Britain
Filed Feb. 6, 1961, Ser. No. 87,147
Claims priority, application Great Britain Feb. 10, 1960
13 Claims. (Cl. 177—105)

This invention relates to improvements in the control of automatic weighing and feeding machines.

Many different kinds of weighing machines are known and have been proposed in which the feed of material to the weighing machine is automatically ended when a required weight has been fed. Where the material is fed to a container carried by the weighing machine it is generally desirable to tare the container before feeding starts, and many proposals have also been made for doing this.

It has been proposed to use a pneumatic system to shut off the feed of material to the weighing machine when a desired weight has been fed. It has now been found that it is possible to make use of a pneumatic system to automatically tare the weighing machine as well as terminate the feed.

According to the present invention there is provided an apparatus for automatically controlling the feed of flowable material to a container supported on weighing equipment, said apparatus comprising a chamber restrictively connectable to a source of constant air pressure, and provided with at least one small opening from which said air emerges and being capable of attachment to a weighing machine such that change of weight over a predetermined range of weights upon said weighing machine causes relative movement between said chamber and an element of the weighing machine and such that air issuing from said opening impinges on said element at least during part of said relative movement, progressive reduction of the free space near said opening resulting from said movement causing increase in back pressure in said chamber which back pressure is operatively connectable to control a feeding device such that at a predetermined pressure the feed is caused to stop, adjusting means comprising a piston movable in an enclosed cylinder being provided to restore said chamber and element to a desired zero position to offset any weight carried by the weighing machine, fluid pressure on one side of said piston being maintained at a substantially constant pressure that is in fixed relationship to the back pressure in said chamber when in the zero position with respect to said element, and the pressure on the other side of said piston being under the control of the back pressure in said chamber to maintain the same said fixed relationship between said last two mentioned pressures at all times during adjustment, and locking means to prevent further changes in pressure on said other side of said piston when said piston is at rest after adjustment.

Further in accordance with this invention there is provided weighing equipment comprising the said apparatus.

It is preferred that the relationship between the back pressure developed in said chamber and the linear movement of the weight measuring element which brings about reduction of the free space should be of the second or higher order. This is preferred because it allows very accurate control of the feed cut-off to be exercised. It is further preferred that as the back pressure increases there should first be a slow rise in back pressure with linear movement of the element, which rise increases in slope, passes through a point of inflection and then increases again. The apparatus used to effect this result is most conveniently one in which the element is in the form of a thin flat metal strip that moves parallel to and in close proximity to the face of said chamber containing the opening to progressively reduce the size of the opening as the weight increases. It will be appreciated that various shapes of opening can be used, but to obtain the present preferred result, it is preferred to use a circular opening.

Figure 2:
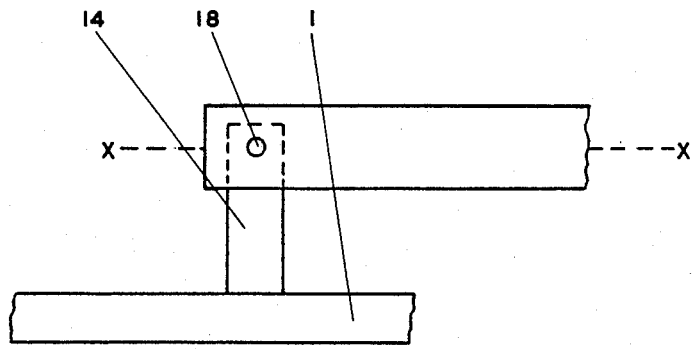
Figure 2:
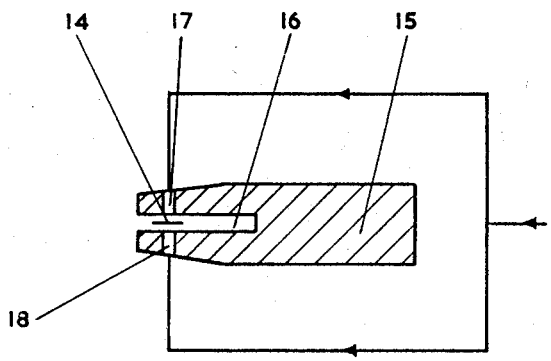

In order that this invention may be more fully understood one embodiment thereof is illustrated with reference to the accompanying drawings FIGURES 1 and 2(a), and 2(b). FIGURE 1 illustrates the layout of the pneumatic circuit by which the weighing operation is controlled. FIGURE 2 illustrates in more detail the arrangement of said chamber and element. To simplify the layout of the pneumatic circuit the control valves are subdivided so that the mechanism that operates the valve is separate from the basic valve unit. Broken lines are shown in FIGURE 1 as connecting the control valve to its related operating mechanism for purposes of clarity. The port connections of each valve unit are shown when the operating mechanism is de-energised.

In FIGURE 1, the beam of the weighing machine is shown at 1, supported on the fulcrum 2. The counteracting mechanism for the beam is the spring 3 which is attached at its upper end to the non-moving support 4. The beam 1 carries at one end, on the same side of the fulcrum as the spring, a support 7 for a standard weight W. Near the same end of the beam is a support 8 for a container e.g. a drum, sack or the like, into which flowable material can be fed from an automatic feeder through the sleeve valve 9. The sleeve valve consists of an elastic or compressible tube section 10 surrounded by a rigid tube 11 to form the chamber 12. Air can be fed under pressure into the chamber 12 to compress the sleeve valve and so reduce and ultimately stop the flow of material through the valve.

On the other side of the fulcrum is a pneumatic measuring device shown at 13. This is shown in greater detail in FIGURES 2 (a) and (b) to which reference is now made. FIGURE 2(a) illustrates a side view of this device and FIGURE 2(b) is a sectional plan view of part of the device through the line X—X. In FIGURE 2(a) a section of the weighing machine beam 1 is shown carrying a flat metal strip 14 which is fixed to the upper side of the beam in an upright position. A metal block 15 having a vertical slit 16 is attached to the weighing machine as hereinafter described so that the flat metal strip 14 can move vertically in the vertical slot 16 in the metal block. The block has two horizontal holes 17 and 18 directly opposite each other on either side of the slot and they are connected to a common air supply as shown by the arrowed lines, so that the two holes form orifices from which streams of air are directed into the slot.

The movement of the beam is limited by stops (not shown) to eliminate unnecessary movement, but the stops are placed to ensure that the left hand side of the beam can move downwards sufficiently to allow the holes 17 and 18 to be completely uncovered by the flat metal strip, and also that it can move upwards sufficiently to allow the flat metal strip to completely cover the holes 17 and 18 and to extend slightly above them. The balance point for any particular weighing cycle is arranged to occur when the back pressure caused by the covering of the holes 17 and 18 by the flat metal strip 14 has reached a predetermined value. The stops are preferably arranged so that the movement of the beam corresponds to the addition of the last 10 to 20% of the filled weight of material. In this particular embodiment the flat metal strip is 0.010 inch thick, the slot is 0.012 inch wide, and the holes are each 0.040 inch in diameter.

Returning to FIGURE 1, the metal block of device 13 is attached to the piston 26 of the pneumatic cylinder 25. The pneumatic cylinder is itself immovably attached to the weighing machine. Underneath the standard weight W is a pneumatic cylinder having a piston 22 which when in the up position lifts the weight W from its support 7. On the side of the piston 22 is the projection 23 which is adapted to operate the valves F and G as it moves in a vertical direction. The valves F and G are each energised when the projection 23 comes into contact with them.

In the pneumatic circuit, A, B, C, D, E, F and G are each three port valves, and N and V are 1:1 relays. $P_1$ and $P_2$ are precision relays, $P_1$ operating at pressures above 15 lb./sq. inch, and $P_2$ operating at pressures below 16 lb./sq. inch. Three sources of air pressure are used viz., one at 80 to 100 lb./sq. inch, one at 25 lb./sq. inch and one at 30 lb./sq. inch. The 80–100 lb./sq. inch source is used, under the control of relay V to operate the sleeve valve 9. The 30 lb./sq. inch source is fed through the restrictor $R_N$ to the pressure control device 13. The back pressure in 13 is at a minimum when the flat metal strip 14 is clear of the holes 17 and 18 and increases as the flat metal strip rises to cover these holes. It controls the operation of relay N to allow air from the 25 lb./sq. inch source to pass at the same pressure as the back pressure in 13, to the relays $P_1$ and $P_2$, to one of the ports of valve E through which it passes when E is energized to allow air at the same pressure to pass through relay V from the high pressure source. Air from relay N at the same pressure as the back pressure in device 13 is also fed to the lower part of the pneumatic cylinder 25 through valve B when valve B is de-energised. The 30 lb./sq. inch supply is fed through restrictor $R_2$ to the upper part of the pneumatic cylinder; the restrictor $R_4$ is also included in this part of the circuit providing a vent to atmosphere so that the pressure in the upper part of the pneumatic cylinder is maintained at a predetermined pressure, in this case 15 lb./sq. inch, which is equal to the back pressure in device 13 when the beam is in the zero position. The 30 lb./sq. inch supply is also fed to the lower part of the pneumatic cylinder when valve B is energized, through restrictor $R_1$, which in combination with restrictor $R_3$ maintains the pressure in the lower part of the pneumatic cylinder at the pre-set pressure.

The one to one relays each consist essentially of a closed vessel divided into two by a flexible diaphragm. One side of the divided vessel is connected by an air line to the controlling air pressure (in the case of relay N the controlling pressure is the back pressures in the air chamber 17, 18 of the pneumatic control device 13). The other side of the divided vessel is connected to an air supply maintained at a pressure higher than maximum controlling pressure (e.g. in the specific embodiment 25 lb./sq. inch). This air supply is supplied to the other side of the diaphragm through a small ball valve which is controlled by the diaphragm. An escape nozzle is also provided so that excess of air is exhausted to atmosphere. Under equilibrium conditions the diaphragm takes up such a position as to allow the air to escape through the nozzle at the same rate at which it is supplied through the ball valve, and the pressures on either side of the diaphragm will be substantially equal. The side of the diaphragm supplied with air at the higher pressure is also equipped with an exit line to allow air to pass from the relay in relatively large quantities at the control pressures. Pneumatic relays of this kind are commercially available. For example, pneumatic relays that have been found suitable for use in this invention may be obtained from Sunvic Controls Ltd. of London, England, under Model Nos. 58S, 61F, 61FZ, 61FL, 61H, 67–25, 67–25R, 67–100, and 67–100R.

It will be appreciated that the relay can be adapted in known manner to cause air to be passed on through the exit line at a pressure which is in a pre-determined fixed ratio (either greater or lower) to the control air pressure.

The 25 lb./sq. inch supply, as well as passing through relay N to the normally isolated port of valve E, is connected to the normally connected port of valve E, so that when valve E is de-energised the pressure of 25 lb./sq. inch operates valve V. The 25 lb./sq. inch source is also connected to valve C and thence when C is energised air from this source is caused to be fed through valve C to the operating mechanism E of valve E so that valve E is energised; it also passes, when valve C is energised, through valve A if de-energised to valve C and thus keeps valve C energised; valve C when de-energised is open to the atmosphere.

The 25 lb./sq. inch supply also passes in parallel to one port of valve $P_1$ and then when $P_1$ is energised to the operate valve A; it also passes from $P_1$ in parallel to one port of relay $P_2$ and through $P_2$ when energised to one port of valve G. When valve G is energised the 25 lb./sq. inch supply is passed to one port of valve A, and thence when A is energised to the operating mechanism of valve C.

The 25 lb./sq. inch supply also passes in parallel through the push button switch, when not operated, to one port of valve D, and then when D is energised to energise valves D and B and to the pneumatic cylinder 21.

It will be appreciated that in view of the different distances of the supports 7 and 8 from the fulcrum, the value of W is arranged to be such that its moment about the fulcrum is the same as that of the net weight to be filled.

The operation of the apparatus will now be described in detail. The table immediately following shows the state of every valve at each stage of a weighing cycle.

| Operation | Position of Valve | | | | | | | | | Piston 22 of Pneumatic Cylinder 21 |
|---|---|---|---|---|---|---|---|---|---|---|
| | A | B | C | D | E | F | G | $P_1$ | $P_2$ | |
| 1. Platform empty | 1 | 2 | 1 | 2 | 1 | 2 | 1 | 1 | 2 | Up. |
| 2. Container on. Push button operates. System balances with empty container. | 1 | 1 | 1 | 1 | 1 | 1 | 1 | 1 | 2 | Starting to move down. |
| 3. Standard weight W on platform 7 and system balanced. | 2 | 2 | 2 | 2 | 2 | 1 | 2 | 2 | 2 | Right down. |
| 4. Standard weight being lifted from platform support 7. | 1 | 2 | 2 | 2 | 2 | 1 | 1 | 1 | 2 | Moving up. |
| 5. Standard weight fully clear. Feeding starts. | 1 | 2 | 2 | 2 | 2 | 2 | 1 | 1 | 2 | Right up. |
| 6. Nozzle back pressure reaches 15 lb./sq. inch. Feeding stops. | 1 | 2 | 1 | 2 | 1 | 2 | 1 | 2 | 2 | Do. |
| 7. Filled container removed from support 8. | 1 | 2 | 1 | 2 | 1 | 2 | 1 | 1 | 2 | Do. |

Valve position 1=de-energised.
Valve position 2=energised.

Valve D is energised from the previous weighing cycle, the standard weight W is clear of the beam and the position switch F is energised. Valve B is also energised so that the upper and lower halves of the pneumatic cylinder 25 are fed respectively from the restrictors $R_2$ and $R_1$ with air at 15 lb./sq. inch thus keeping the nozzle locked in position. An empty container is placed on the platform 8 and the push button is then operated. Valve D vents to atmosphere, and is de-energised thus holding the valve operating mechanism off.

Valve B is also de-energised and its valve unit connects the lower part of the pneumatic cylinder to the output of relay N. The upper part of the cylinder is always held at the fixed pressure of 15 lb./sq. inch by the potential divider arrangement of restrictors $R_2$ and $R_4$.

The lower part of standard weight cylinder 21 is also opened to atmosphere when valve D is de-energized by the operation of the push button (initially through valve D and the push button and thereafter when D is de-energised through restrictor $R_D$ and the de-energised valves A and C), and the piston therefore falls lowering the standard weight on to the beam. Position switch F is released, and position switch G is operated when the piston 22 is right down.

If there is any change in tare weight the beam will be displaced from zero, and the back pressure in the chambers 17, 18 in device 13 will be greater or less than 15 lb./sq. inch according to whether the tare weight has increased or decreased. If the back pressure has decreased, then the pressure in the lower part of the pneumatic cylinder 25 will also decrease, and will be less than the pressure in the upper part. The piston 26 will therefore move downwards carrying device 13 towards the beam; the nozzle back pressure will then start to rise, as will also the pressure in the lower part of the pneumatic cylinder. This adjustment will continue until the nozzle back pressure equals the pressure in the upper part of the pneumatic cylinder.

The means provided to lock the adjusting means preferably comprises a pneumatic switching device that can change from one switching condition to a different condition when there is a change of pressure at a particular value and which is in one of said conditions between two pre-determined pressures and in the other of said conditions at pressures above the higher of said two pressures and below the lower of said two pressures. The preferred form of locking means comprises two precision relay $P_1$, $P_2$ one of which is adapted to change from one switching condition to its other switching condition at a particular pressure change and the other of which is adapted to change from one switching condition to its other switching condition at a different particular pressure change, the pneumatic circuit being arranged so that locking of the adjusting means is brought about by the combination of the conditions of the relays between said two particular pressures which combination operates a pneumatic valve to isolate said other side of the piston. It is convenient to use two relays that are in the same condition between the two pressures, i.e. either both energised or both de-energised.

When balance is established at tare i.e., with the empty container in place and the standard weight on the beam, precision relays $P_1$ and $P_2$ are energised thus energising valve A. With the piston 22 right down, position switch G is also operated so that air at 25 lb./sq. inch is fed through the ports of precision relays $P_1$, $P_2$, and valves G and A to valve C and also through the restrictor $R_D$ to valves D and B. The energising of valve B causes the position of piston 26 to be locked, and the energising of valve D causes air to flow at 25 lb./sq. inch through the port of valve D to the cylinder 21 to move the piston 22 upwards and raise the standard weight from the platform. Valve D provides its own hold on and can only be de-energised, together with valve B by the operation of the push button.

As the standard weight is raised off the platform, position switch G is de-energised, the left hand side of beam 1 falls and the back pressure in device 13 falls below the pre-set value causing $P_1$ to be de-energised (operation 4 of the table).

With the standard weight clear of the platform the beam remains in the displaced position because the lower part of cylinder 25 is now isolated from the tare-offsetting system and can no longer operate to adjust the position of the device 13. When the piston is right up position switch F is caused to operate. In this position (stage 5 of the table) valve A is de-energised but valve C remains energised by its own connection to the 25 lb./sq. inch air supply. Valves B, D and E also remain energised.

With valve E energised from stage 3 onwards, the operation of the sleeve valve 9 is controlled by the back pressure in the nozzle 13 controlling relays N and V. In order to allow the valve 9 to feed easily, the relay N is adapted to allow air to pass only when the pressure in 13 is 4 lb./sq. inch or more. Therefore when the standard weight is lifted off, the back pressure in 13 first falls, allowing the pressure in valve 9 to fall and therefore the feed to start. As the back pressure in device 13 increases and rises above 4 lb./sq. inch the controlling pressure on the sleeve valve increases thus reducing the rate of feed. The size and position of the device 13 with respect to the beam is arranged so that the back pressure does not start to increase until the weight fed is within a few pounds of the final weight. When the nozzle pressure reaches the pre-set value of 15 lb./sq. inch $P_1$ is energised causing A to be de-energised, which in turn causes C to be de-energised through connections A, G and F. With C de-energised E is vented to atmosphere and allows the full 25 lb./sq. inch air supply to be fed to the sleeve valve ensuring a tight shut off (stage 6 of the table). The presence of the restrictor $R_D$ in the circuit ensures that valves D and B remain energised when C is de-energised.

When the filled container is removed from the platform the back pressure in device 13 falls causing $P_1$ to be de-energised. The state of the relays is shown at stage 7 of the table which is the same as stage 1.

If the change in tare is such as to cause an increase in back pressure in device 13, then adjustment will take place in the opposite direction until the pressures are again balanced. There is no other change in the operation of the apparatus.

The purpose of precision relay $P_2$ is to prevent feeding from starting if the automatic taring should produce an overshoot in the nozzle pressure, and also to act in combination with relay $P_1$ to lock the adjusting means when there is balance.

In the embodiment hereinbefore described, the pressure controlling device comprises a chamber having orifices from which air from a common source is directed from opposite sides of an aperture, and across which orifices an element of the weighing machine can move to interrupt the flow of air. A device having this form is particularly advantageous since by selecting suitable sizes of orifice, width of aperture and thickness of element, the back pressure developed in the chamber can be made to vary considerably with very small movements of the element. Pressure controlling devices having this form have the further advantage that since the air pressure on either side of the element is the same, the air pressure has no effect on the movement of the element. Also since the element is free to move past the orifices in either direction, any vibrations of the element when it is close to the orifices are not likely to cause any damage to the orifices.

The pressure controlling device may take other forms. Thus, for example, air issuing from a nozzle may be made to impinge directly on the weighing machine beam so that as the beam rises it reduces the air flow and thus increases the back pressure.

The present apparatus can be applied to weighing machines other than the beam type hereinbefore described. For example it can be applied to a cantilever type weighing machine.

In the embodiments particularly described, the means for controlling the flow of material to the container is a valve having the form of a flexible-walled tube through which the material can flow, which is surrounded by a rigid casing forming an enclosed chamber with the outer wall of the tube, the casing being provided with one or more entries to allow air under pressure to be introduced into the chamber, or to allow pressure within the chamber to be reduced to atmospheric. A valve of this kind is particularly suitable for use in the present pneumatic method of controlling the rate of flow of material to the weighing machine. It allows a wholly pneumatic system to be used and therefore the whole arrangement is relatively simple. It is precise in operation and when used in this invention to reduce the rate of feed as the end point is approached in a continuous manner, allows accurate control of the amount of material fed to be maintained. The use of valves of this kind in the present apparatus is therefore a preferred feature of this invention.

It will be appreciated that other forms of feed limiting devices may be used. Thus, for example, the pneumatic control may be used to control an electric circuit so that its voltage output increases as the back pressure increases, and this source of electric energy is then used to control a valve or other device that controls the rate of feed of material to the weighing machine. For example, a vibrating feeder may be used and its amplitude can be reduced by a means of this kind, the reduction in amplitude causing a reduction in the feed rate.

I claim:

1. In combination, a weighing machine including a weight measuring control element, means for supporting a container, and means for feeding flowable materials therein; pneumatic means for controlling the tare setting and feed of flowable material into a container on said supporting means including: chamber means, means for connecting said chamber means to a source of constant air pressure, said chamber means having an orifice allowing an escape of air therefrom, said control element being adapted for attachment to said weighing machine wherein a change of weight within a predetermined range of weight on said machine causes relative movement between said chamber means and said control element, wherein air escaping from said orifice impinges on said control element during at least a part of the relative movement therebetween, and the progressive reduction of the free space between said orifice and said control element during said relative movement is operative to increase the back pressure in said chamber means; means responsive to the back pressure in said chamber means for controlling said feeding means wherein said feeding means is closed in response to a predetermined back pressure; adjusting means for offsetting the weight of the container into which material is to be fed and for setting said chamber means and said control element to any desired zero position, said adjusting means including: a cylinder and a piston movable therein, means for supplying fluid pressure to each side of said piston wherein the pressure of one side is substantially constant and in fixed relationship to the back pressure in said chamber means when said control element and chamber means are in their respective zero positions and the pressure on the other side being under control of the back pressure in said chamber means to maintain said relationship at all times during adjustment; and locking means for preventing further changes in pressure on the other side of the piston when said piston is stationary after adjustment.

2. The combination defined in claim 1 wherein said chamber includes a flat face and said control element is movable parallel to and in close proximity to said flat face.

3. The combination defined in claim 2 wherein the relationship between back pressure developed in said chamber and the linear movement of said control element is of the second or higher order.

4. The combination defined in claim 3 wherein said orifice is circular.

5. The combination defined in claim 1 wherein said pneumatic control device includes a member having a slit and at least one chamber opening into the slit through the orifice from which said air escapes and said weight measuring control element comprises a thin feeler gauge adapted to move in said slit to interrupt the flow of air from the chamber into said slit.

6. The combination defined in claim 1 wherein said chamber is formed in the member which is carried by the piston of said adjusting means.

7. The combination defined in claim 1 wherein said fixed pressure relationship is a 1:1 relationship.

8. The combination defined in claim 7 including a pneumatic relay operative to maintain pressure in said chamber at said other side of the piston, the flow of fluid from said relay being under the control of the pressure in said chamber.

9. The combination defined in claim 1 wherein means to lock said adjusting means comprises a pneumatic switching device operative to change from one switching condition to a different switching condition when there is a change of pressure in said chamber and which is in one of said switching conditions between two predetermined pressures and in the other switching condition at pressures above the higher of said two pressures and below the lower of said two pressures.

10. The combination defined in claim 9 wherein said locking means comprises two precision relays, one of which is adapted to change from one switching condition to its other switching condition at a particular pressure change and the other of which is adapted to change from one switching condition to its other switching condition at a different particular pressure change, the pneumatic circuit being arranged so that locking of the adjusting means is brought about by the combination of the conditions of the relays between said two particular pressures, and a pneumatic valve operated thereby to isolate said other side of the piston.

11. The combination defined in claim 1 wherein the weighing machine is a beam type weighing machine.

12. The combination defined in claim 1 wherein during said adjustment a standard weight corresponding to the net weight of material to be fed is carried by the beam of said weighing machine and an empty container is also carried by said beam, and means are provided to remove said standard weight from the beam when said adjustment is complete.

13. Automatic net weighing machine including a beam; a compressed air chamber having an air escape orifice therein; means providing pneumatic regulation of the tare setting and feed, the taring being responsive to the back pressure formed in said compressed air chamber by movement of said beam relative to said orifice; first means operatively connected to said beam for supporting a container to be filled; second means operatively carried by said beam for supporting a standard weight; valve actuated piston-and-cylinder lifting means positioned in co-operative relationship to said second support means to control a standard weight thereon; tare compensating and locking means including a cylinder having a piston movable therein, said piston being in connection with said compressed air chamber wherein movement of said piston causes movement of said air chamber, means for maintaining a constant fluid pressure on one side of said piston, and means for maintaining fluid pressure on the other side of said piston under control of the back pressure in said chamber so that when said chamber is in a zero position with respect to the beam, the pressures on either side of the piston are equal.

References Cited in the file of this patent

UNITED STATES PATENTS

| | | |
|---|---|---|
| 2,773,685 | Aagaard | Dec. 11, 1956 |
| 2,851,063 | Leinhart | Sept. 9, 1958 |
| 3,024,857 | Charcuset | Mar. 13, 1962 |